United States Patent
Saito (10) Patent No.: US 6,677,919 B2
(45) Date of Patent: Jan. 13, 2004

(54) HEAD MOUNTING MECHANISM AND HEAD-MOUNTED APPARATUS USING IT

(75) Inventor: Yoshihiro Saito, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 09/766,634

(22) Filed: Jan. 23, 2001

(65) Prior Publication Data

US 2002/0008677 A1 Jan. 24, 2002

(30) Foreign Application Priority Data

Jul. 19, 2000 (JP) ........................................ 2000-219489

(51) Int. Cl.⁷ ................................................. G09G 5/00
(52) U.S. Cl. ................................................. 345/8; 345/7
(58) Field of Search ...................... 345/8, 7, 9; 340/980; 359/630

(56) References Cited

U.S. PATENT DOCUMENTS

| | | | | |
|---|---|---|---|---|
| 5,742,263 A | * | 4/1998 | Wang et al. ................... | 345/7 |
| 5,781,165 A | * | 7/1998 | Tabata ......................... | 345/660 |
| 5,844,656 A | * | 12/1998 | Ronzani et al. ................ | 345/7 |
| 6,157,291 A | * | 12/2000 | Kuenster et al. ............... | 345/8 |
| 6,239,771 B1 | * | 5/2001 | Usuki et al. .................. | 340/980 |
| 6,351,252 B1 | * | 2/2002 | Atsumi et al. ................. | 345/8 |
| 6,388,640 B1 | * | 5/2002 | Chigira et al. ................ | 345/8 |
| 6,396,463 B1 | * | 5/2002 | Tomono ........................ | 345/32 |
| 6,400,341 B1 | * | 6/2002 | Maeda et al. .................. | 345/8 |
| 6,424,321 B1 | * | 7/2002 | Ronzani et al. ................ | 345/102 |

* cited by examiner

Primary Examiner—Vijay Shankar
Assistant Examiner—Nitin Patel
(74) Attorney, Agent, or Firm—Fitzpatrick, Cella, Harper & Scinto (57) ABSTRACT

An object of the present invention is to provide a head mounting mechanism with less stress and with a good wearing feeling by which constant hold is assured regardless of the individual difference of head size and also to provide a head-mounted apparatus using it. For accomplishing this object, the mechanism of the present invention is constructed to press the frontal region and occipital region of a wearer by frontal pressing pad and occipital pressing pad whereby a device such as display part or the like is mounted on the head. In this structure frames located on the temporal regions are subjected to resistance against movement in the direction to decrease a spacing between the frames, so that no substantial pressing force is imposed on the temporal regions of the wearer.

27 Claims, 9 Drawing Sheets

HEAD MOUNTING MECHANISM AND HEAD-MOUNTED APPARATUS USING IT

BACKGROUND OF THE INVENTION

1. Field of the Invention

The present invention relates to a head mounting mechanism, for example, used for enabling a device such as a video display device or the like to be mounted on or dismounted from the head of a human body, and to a head-mounted apparatus using it.

2. Related Background Art

The head mounting mechanism of this type is used in head-worn equipment detachably mounted on the head, e.g., in head-mounted video display devices (head-mounted displays) and the like. Examples of the well-known head mounting mechanisms used for the head-mounted displays include a configuration that has a pressing member disposed in the center of display part and frames extending along the temporal regions from the two sides of the display part and that presses the forehead part or the frontal region by the pressing member and the temporal regions or the part ranging from the temporal regions to the occipital region by the frames, a configuration using a band that tightly holds the entire periphery of the head, and so on.

However, the temporal regions of the wearer are pressed in any of the head mounting mechanisms of such configurations.

According to the experience of the inventor, the temporal regions have weaker resistance to pressure than the frontal and occipital regions and are more sensitive to stress under pressure even under application of the same pressing force. In addition, the wearer tends to feel the pressure even after the device is dismounted.

Particularly, in the structure wherein the temporal regions are pressed by elasticity of springs or the like, people of larger head size are subject to stronger pressing force and thus feel stronger stress.

SUMMARY OF THE INVENTION

The present invention has been accomplished in view of the problem of the prior art discussed above and an object of the present invention is to provide a head mounting mechanism that can provide constant hold, regardless of the individual difference of head size, and that achieves reduction of stress so as to present a good wearing feeling, and also to provide a head-mounted apparatus using it.

Namely, a head mounting mechanism according to one aspect of the present invention is a head mounting mechanism for mounting a predetermined device on the head of a wearer or in the vicinity of the head, comprising: frontal pressing means which presses the frontal region of the wearer; supporting means connected to the device and to the frontal pressing means; occipital pressing means which presses the occipital region of the wearer; and connecting means which connects the frontal pressing means to the occipital pressing means directly or through the supporting means so as to be movable in directions to decrease and increase a spacing between the two means, wherein, during a mounting operation of the head mounting mechanism, a pressing force imposed on the temporal regions of the wearer by the connecting means is smaller than pressing forces imposed on the wearer by the frontal pressing means and by the occipital pressing means.

The pressing force imparted on the temporal regions of the wearer by the connecting means is preferably substantially zero, or the pressing force imposed on the head of the wearer during the mounting operation of the head wearing mechanism is preferably substantially caused by only the frontal pressing means and the occipital pressing means.

It is also preferable that the occipital pressing means and the connecting means comprise two occipital pressing means and two connecting means and that each of the connecting means connect one of the occipital pressing means to the frontal pressing means along the temporal region, or it is preferable that the connecting means comprise two connecting means and that the mechanism comprise resistance generating means which is provided in a connection between each of the connecting means and the supporting means or the frontal pressing means and which generates a force in a direction to resist movement in a direction to decrease a spacing between the connecting means.

It is also preferable that the connecting means comprise two connecting means and that each of the connecting means connect the common occipital pressing means to the common frontal pressing means along the temporal region, or it is preferable that the connecting means comprise two connecting means, that each of the connecting means be connected to the supporting means or to the frontal pressing means with a spacing variable between the two means, and that amounts of displacement of the respective connecting means in variation of the spacing between the two means be equal to each other. Further, it is more preferable that the connecting means comprise two connecting means and that the connecting means be energized in a direction to increase a spacing between the connecting means.

It is also preferable that the connecting means be placed including a line connecting the frontal pressing means and the occipital pressing means along the head of the wearer and passing the vicinity of the parietal region.

It is also preferable that the frontal pressing means and the supporting means be connected so as to be movable in a direction to change a distance between the device and the wearer. Further, it is preferable that the connecting means comprise movement limiting means which limits movement in the direction to increase the spacing between the frontal pressing means and the occipital pressing means.

Another aspect of the present invention concerns a head-mounted apparatus using the head mounting mechanism according to the present invention.

DETAILED DESCRIPTION OF THE PREFERRED EMBODIMENTS

The present invention will be described hereinafter based on the preferred embodiments thereof with reference to the drawings. Described in the following embodiments are examples in which the head mounting mechanism according to each embodiment of the present invention is applied to the head-mounted display device being an example of the head-mounted apparatus, but it is noted that the head mounting mechanism according to the present invention can also be applied similarly to other head-mounted apparatus.

First Embodiment
Entire Structure

Figure 1:
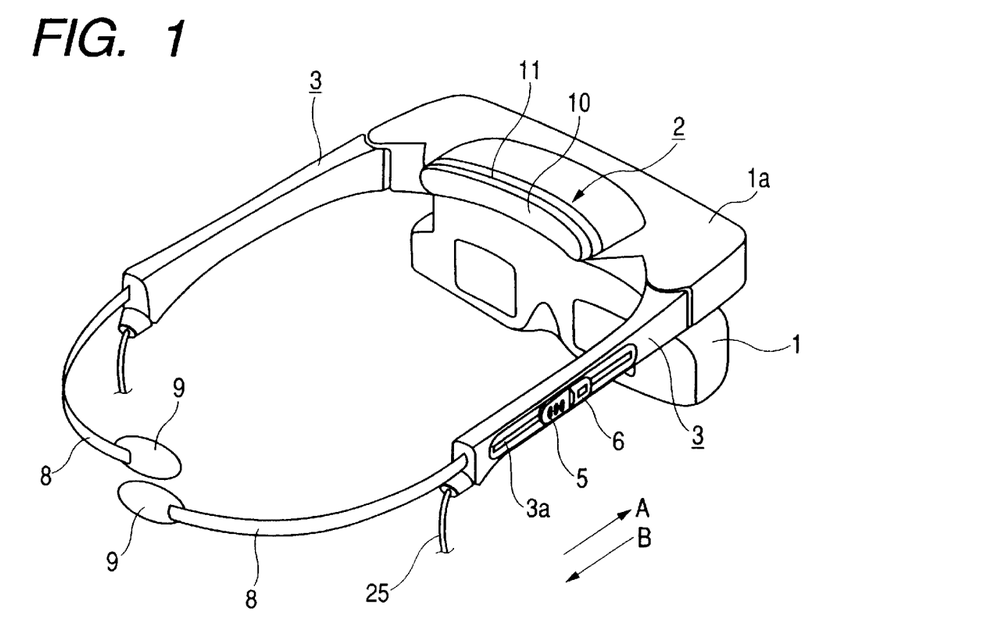
FIG. 1 is a perspective view to show the entire structure of a head-mounted display device to which the head mounting mechanism according to the first embodiment of the present invention is applied.

FIG. 1 is a perspective view to show the entire structure of the head-mounted display device to which the head mounting mechanism according to an embodiment of the present invention is applied. In FIG. 1, reference numeral 1 designates a display part and 2 a forehead presser. The forehead presser 2 consists of a spongelike pad 10 which presses the forehead of a wearer wearing the head-mounted display, and a pad mount 11 for the pad 10 to be mounted. The forehead presser 2 is attached so as to be movable forward and backward (in directions of arrows A and B in the figure), to a support 1a which connects the display part 1 with frames 3 described hereinafter. Numeral 3 denotes the frames extending backward along the temporal regions from the two sides of the support 1a. On the occipital side each frame 3 is provided with a member with spring (which will be referred to hereinafter as a pressing spring) 8 and a spongelike pad 9 is attached to the distal end of the pressing spring 8.

The pressing springs 8 are shaped so as to be vertically shifted from each other at the distal end in order to prevent their pads 9 from interfering with each other, as illustrated in FIG. 1. A knob 5, which is slidable along a slot 3a cut in the frame 3, is integrally attached to each pressing spring 8. The release button 6 detachably engages with the knob 5 to restrict movement of the pressing spring 8 in the direction of arrow B (in the direction to relax the pressure imposed on the head by the head mounting mechanism). Numeral 25 denotes a signal cable which connects the display part 1 to a controller (not illustrated) for display control.

Fitting Structure of Forehead Presser 2

Figure 2:
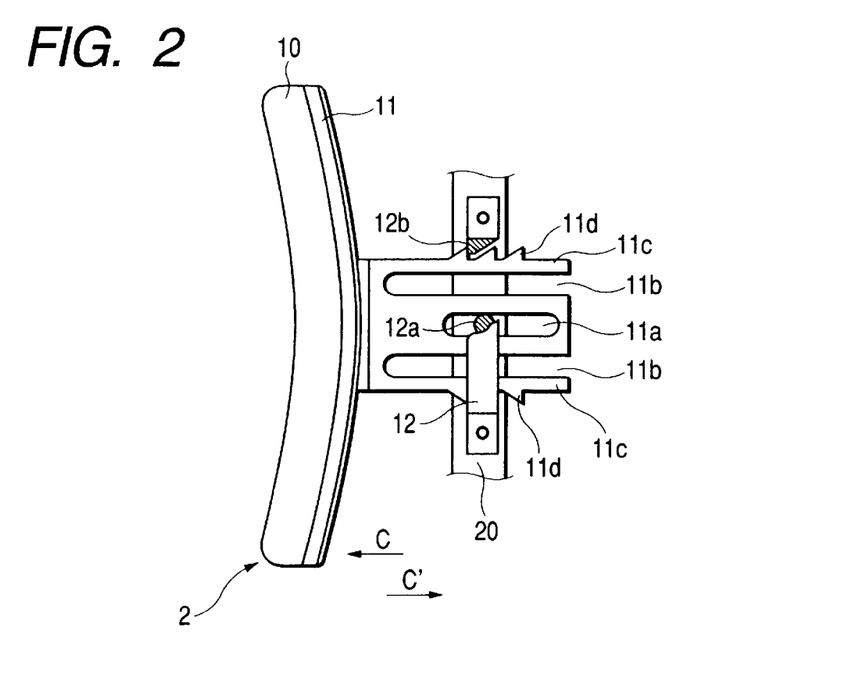
FIG. 2 is a diagram for explaining a fitting structure of a forehead presser 2 in FIG. 1.

FIG. 2 is a diagram to explain the fitting structure of the forehead presser 2 in FIG. 1. As illustrated in FIG. 2, the pad mount 11 is attached to a stay 20 embedded in the support 1a. The stay 20 is provided with a guide member 12 and the guide member 12 has a pin 12a in an integral form.

On the other hand, the pad mount 11 is provided with a long slot 11a as illustrated. The pin 12a integral with the guide member 12 is fitted in this long slot, so that the length of the long slot 11a limits the moving distance of the pad mount 11, i.e., the moving distance of the forehead presser 2. Cantilever beams 11c are formed with a clearance 11b on the both sides of the long slot 11a in the pad mount 11 and each cantilever beam 11c is provided with a plurality of claws 11d. The cantilever beams 11c possess spring and permit the forehead presser 2 (pad 10) to freely move in the withdrawing direction (the direction of arrow C, which is equal to the direction of an arrow B in FIG. 1 and direction to enhance the pressure on the head by the head mounting mechanism) but block the movement in the reverse direction (the direction of an arrow C') while the claws 11d collide against faces 12b of the guide member 12.

For moving the pad 10 back (away), the pair of cantilever beams 11c are bent inward (toward the long slot 11a), for example, by remote control from the support 1a and then the pad 10 is pushed forward in a state in which the claws 11d are disengaged from the faces 12b of the guide member 12.

In the structure of FIG. 2, the position of the forehead presser 2 can be varied stepwise by the number of claws 11d provided in the cantilever beams 11c, but stepless variation can also be achieved by employing such structure that the pin 12a of the guide member is replaced by a shoulder bolt or the like and that the position of the forehead presser 2 is determined by fastening the pad mount 11 with the stay 20 and shoulder bolt, instead of the claws 11d.

Fitting Structure of Frames 3

Figure 3:
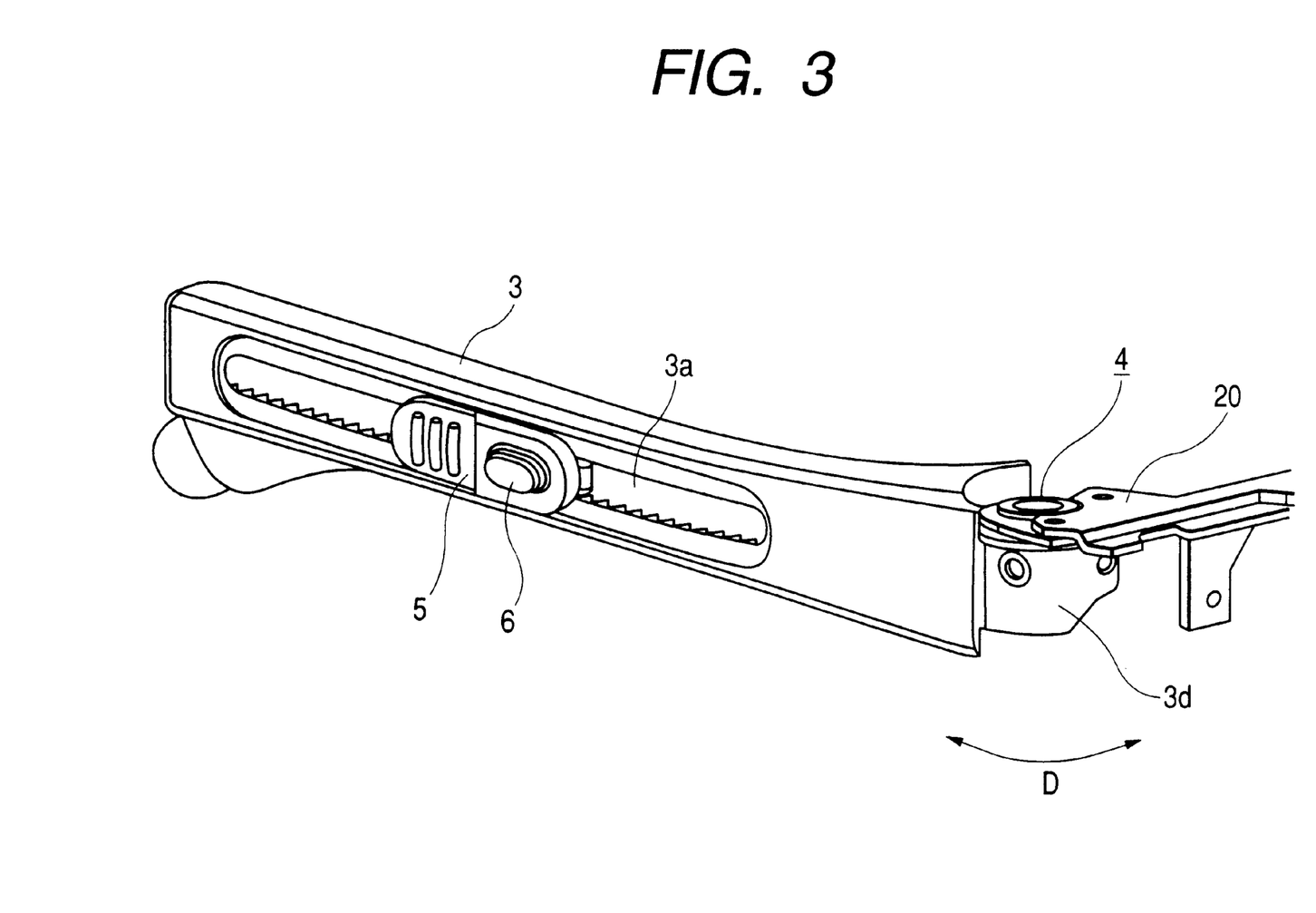
FIG. 3 is a perspective view to show a fitting structure of a frame 3 in FIG. 1.

FIG. 3 is a perspective view to show the fitting structure of the frames 3.

As illustrated in FIG. 3, each frame 3 is attached so as to be rotatable in directions of arrows D, through a friction 4 to the stay 20 embedded in the support 1a.

Figure 4:
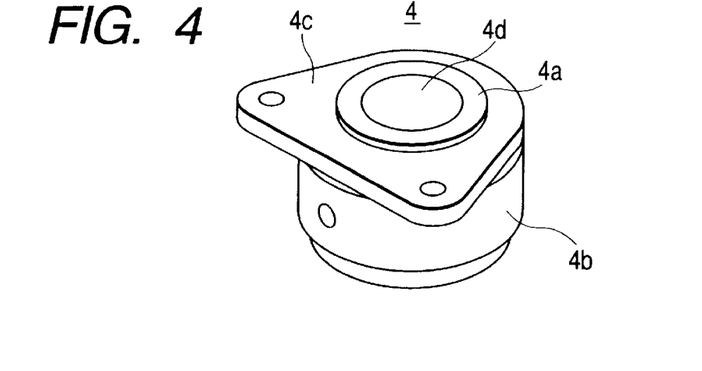
FIG. 4 is a perspective view to show a friction 4 in FIG. 3.
Figure 5:
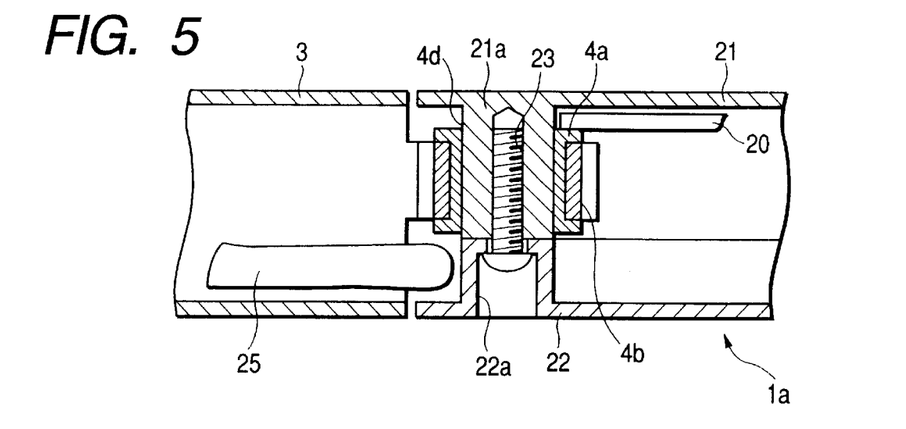
FIG. 5 is a vertical cross-sectional view of a fitting portion around the friction 4.

FIG. 4 is a perspective view to show the friction 4 and FIG. 5 a vertical cross-sectional view of the fitting portion (hinge part) around the friction 4. As apparent from these figures, the friction 4 consists of an inner ring 4a having a mount 4c, and an outer ring 4b and is constructed to present a constant frictional force between the inner ring 4a and the outer ring 4b. The inner ring 4a is attached through the mount 4c to the stay 20 embedded in the support 1a and the outer ring 4b is fixed to the frame 3. Therefore, the frame 3 rotates under the constant frictional force relative to the display part 1 (support 1a) around the hinge of friction 4.

The inner ring 4a is provided with a through hole 4d, and a boss 21a of an exterior upper cover 21 forming a casing of the support 1a is fitted in this hole 4d. A boss 22a of an exterior lower cover 22 is screwed to the boss 21a of the exterior upper cover with a screw 23.

In this structure, the frictional force of the friction 4 acting on the hinge part between the display part 1 (support 1a) and the frame 3 is received by both the stay 20 and the bosses 21a, 22a of the exterior covers 21, 22 being portions of the casing. This means that the hinge part has sufficient strength without need for especially enhancing the rigidity of the stay 20 and the casing of the display part 1. This is also advantageous in downsizing of the apparatus, because there is no need for provision of a special space for installation of the exterior covers 21, 22.

Fitting Structure of Pressing Springs 8

Next, the fitting structure of the pressing spring 8 to the frame 3 will be described referring to FIG. 6 to FIG. 8.

Figure 6:
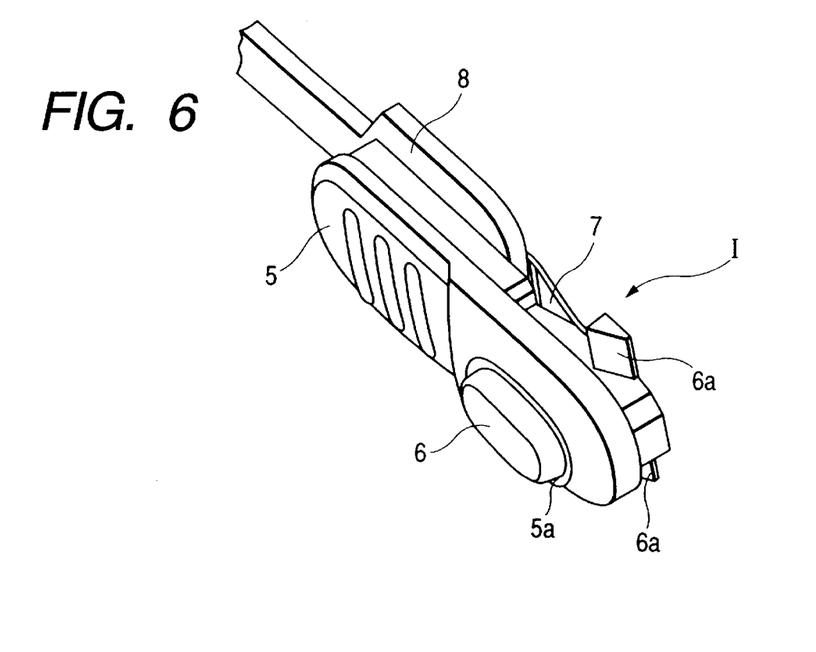
FIG. 6 is a perspective view to show the positional relation between a release button 6 and a knob 5 attached to a pressing spring 8.
Figure 7:
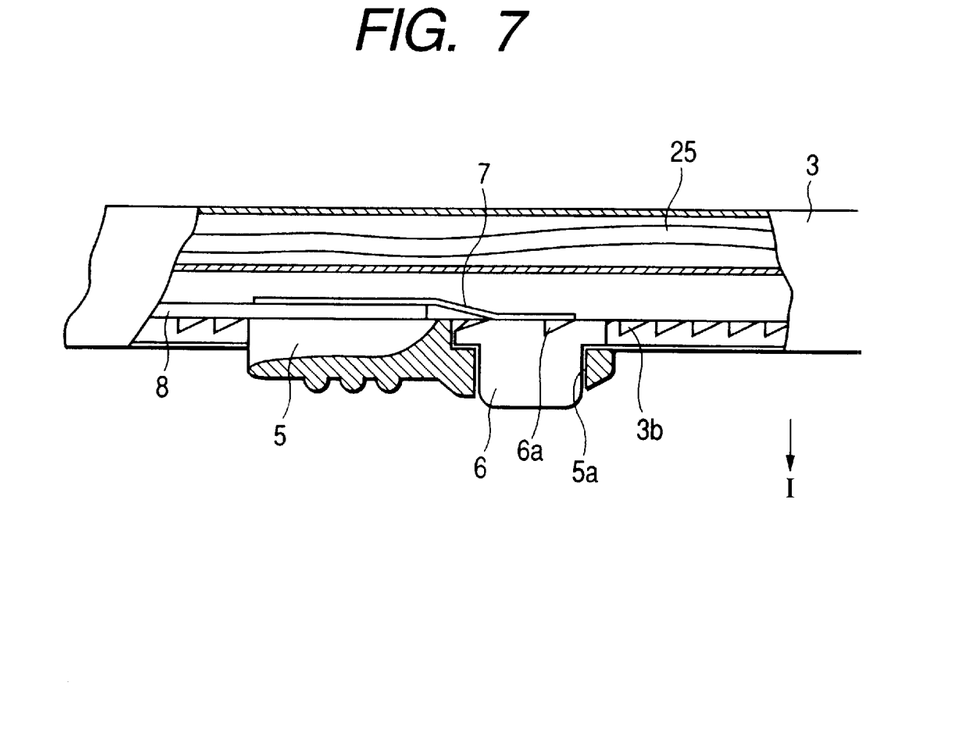
FIG. 7 is a horizontal cross-sectional view to explain a configuration by which movement of the knob 5 is restricted by the release button 6.
Figure 8:
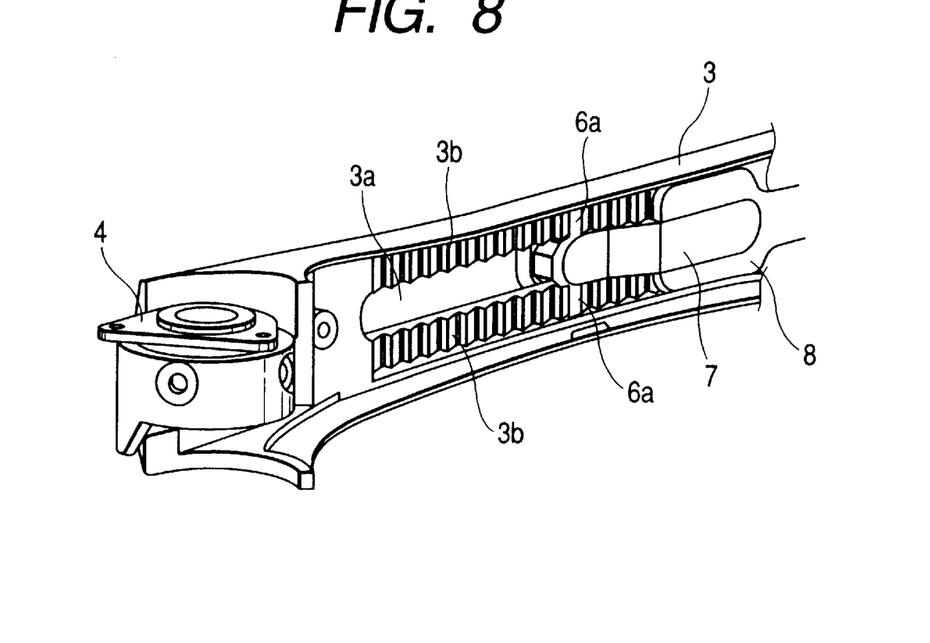
FIG. 8 is a perspective view to show the inside of the connection between the frame 3 and the pressing spring 8.

FIG. 6 is a perspective view to show the positional relation between the release button 6 and the knob 5 provided on the pressing spring 8, FIG. 7 a horizontal cross-sectional view to explain a configuration in which movement of the knob 5 is restricted by the release button 6, and FIG. 8 a perspective view to show the inside of the connection between the frame 3 and the pressing spring 8.

A hole 5a is bored in the knob 5, as illustrated in FIGS. 6 and 7, and the release button 6 is fitted in this hole 5a. The release button 6 is energized in a direction of an arrow I by a plate spring 7 integrally attached to the knob 5.

A pair of claws 6a are provided on side faces of this release button 6, as illustrated in FIGS. 6 and 8. The claws 6a are arranged to gear with serrate projections 3b provided in inner surfaces on the both sides of the slot 3a of the frame 3, as illustrated in FIG. 8, and a ratchet mechanism is constructed of the serrate projections 3b, the claws 6a, and the plate spring 7. Accordingly, in FIG. 1, the knob 5 freely moves in the direction of the arrow A, which is the direction to push the head, but the motion is blocked in the reverse direction of the arrow B with the claws 6a engaging with the serrate projections 3b. For moving the knob 5 in the direction of the arrow B, the release button 6 is depressed to disengage the claws 6a from the serrate projections 3b.

State During Mounting

Figure 9:
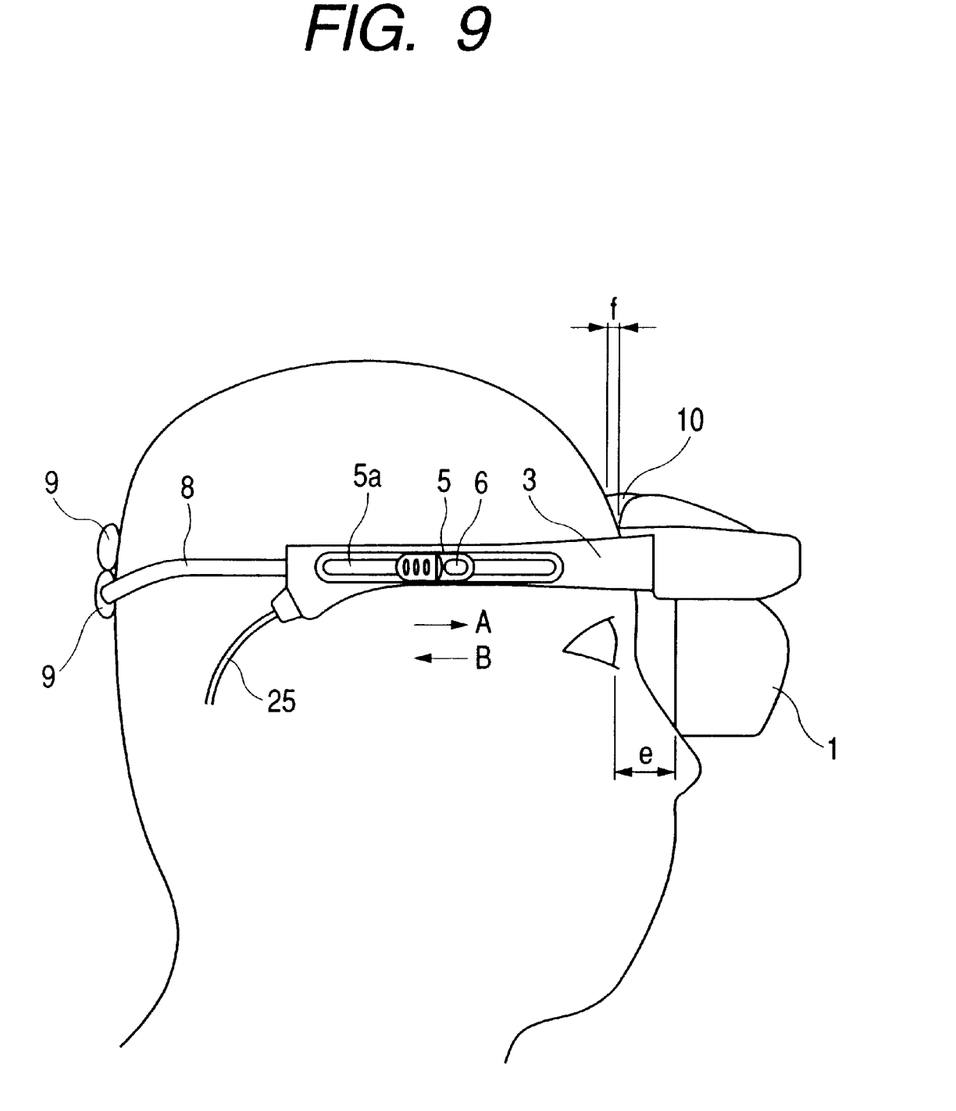
FIG. 9 is a diagram to show a state in which the head-mounted display device of FIG. 1 is mounted.

For mounting the head-mounted display of the present embodiment using the head mounting mechanism of the above structure, on the head, the head is first set between the frames 3 by turning the frames 3 inward before they lightly touch the temporal regions against the frictional force of the frictions 4. Thereafter, the knobs 5 are moved in the direction of the arrow A so that the frontal region and occipital region are placed between the pad 10 and the pads 9, as illustrated in FIG. 9.

In the head-mounted display according to the present embodiment, the signal cable 25 which connects the display part 1 to the controller (not illustrated) for display control is routed so as to pass the hinge part between the display part 1 and the frame 3, pass behind the knob of the frame 3 (see FIG. 7), and go out of the occipital end of the frame 3. For this reason, the weight is well-balanced in the antero-posterior direction so as to avoid concentration of weight on the display part 1, which can enhance the stability and improve a wearing feeling when the wearer wears the head-mounted display device.

The distance e between the observer's pupil position (eye surface) and the display part 1, i.e., the observation distance of the head-mounted display device is determined more or less from the design of the display apparatus and the device has to be mounted so that the spacing e between the display device and the pupils is approximately equal to the designed value in a state in which the pad 10 is urged against the forehead. Further, the distance f between the observer's forehead and the pad 10 of the forehead presser varies depending upon the individual difference. However, the appropriate observation distance e can be always assured, because the position of the pad 10 is variable in the antero-posterior direction, as described referring to FIG. 2.

As described above, the head mounting mechanism according to the present embodiment is constructed in the structure in which the pads 9 as occipital pressing means are arranged movable back and forth relative to the pad 10 as frontal pressing means, whereby the constant hold can be always assured while absorbing dispersion due to the individual difference in the size, shape, etc. of the head, particularly, in the antero-posterior direction. At the same time, the frames 3 can be fixed at any position by the frictions 4 provided in the hinge parts between the display part 1 and the frames 3. Namely, the device can be held in a lightly touching state without pressure on the temporal regions while absorbing the dispersion, particularly, in the width direction of the head size due to the individual difference. Therefore, the display part can be prevented from rotating about an axis passing the pads 9 and the pad 10.

Modification of First Embodiment

The first embodiment used the friction 4 in each hinge part between the display part 1 and the frame 3, but a ratchet mechanism or the like may also be used instead of the friction 4. In another configuration the frame can be fixed at any rotational position by use of a driving motor or the like in the hinge part.

Figure 10:
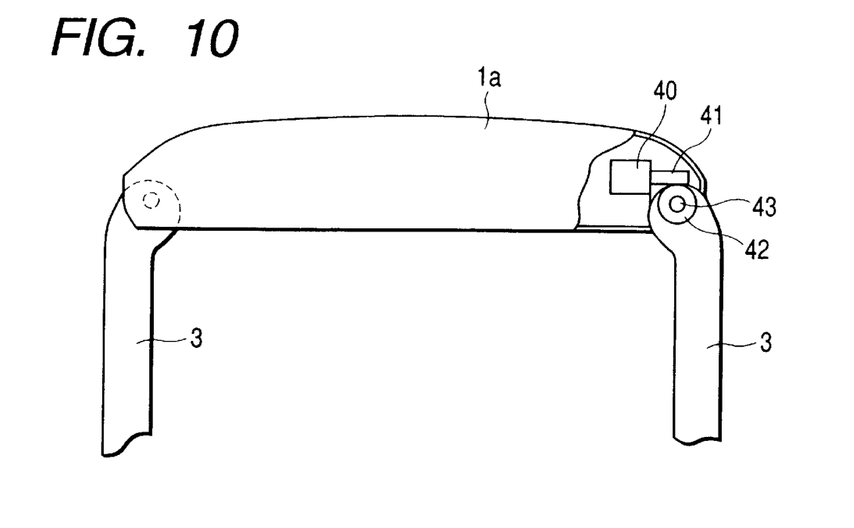
FIG. 10 is a diagram to explain a modification of the first embodiment.

Specifically, as illustrated in FIG. 10, the frame can be fixed at any rotational position by rotating the frame about an axis of shaft 43 by a worm gear 41 attached to a driving motor 40 on the support 1a side and a worm wheel 42 integrally attached to the frame 3.

In any event, any mechanism can be employed as long as it can support the temporal regions so as to prevent the rotation of the device about the axis of the pads 9 and 10.

Second Embodiment

Figure 11:
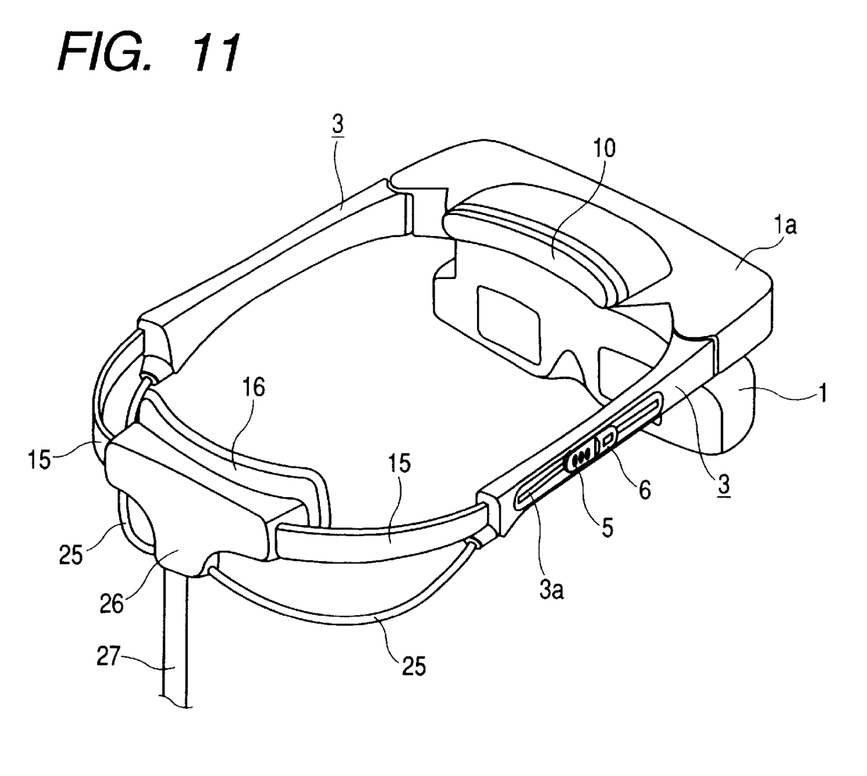
FIG. 11 is a perspective view to show the entire structure of a head-mounted display device to which the head mounting mechanism according to the second embodiment of the present invention is applied.

FIG. 11 is a perspective view to show the structure of another head-mounted display device to which the head mounting mechanism according to the second embodiment of the present invention is applied.

In the first embodiment the pads pressing the occipital region were attached to the left and right independent pressing springs 8, whereas the present embodiment is characterized in that a pad 16 being the occipital pressing means in a closed state is pressed against the head by flexible bands 15, 15 and the other structure is the same.

Namely, for mounting the device onto the head, the head is put into the space surrounded by the pads 10, 16 and the frames 3 with the knobs 5 back, then the frames 3 are turned in that state against the frictions 4 provided in the hinge parts between the display part 1 and the frames 3 until they lightly touch the temporal regions, and the knobs 5 are also moved forward along the slots 3a provided in the frames 3 to change the length of the bands 15, thereby moving the pad 16 relative to the pad 10. Then the frontal and occipital regions are placed between the pad 10 and the pad 16 to fix the display part 1 on the head.

In the present embodiment reference numerals 25 and 27 represent cables and the cables 25 going out of the occipital ends of the left and right frames 3 are bundled into one cable 27 in a pad mount 26 which supports the pad 16.

By routing the cables in this way, a good weight balance is maintained in the antero-posterior direction so as to prevent concentration of weight on the display part 1, as in the first embodiment, whereby the stability and the wearing feeling can be improved in the mounted state of the head-mounted display device.

In the head mounting mechanism of the present embodiment, since the left and right frames 3 are connected through the bands 15, the hold by the pad 10 and the pad 16 can be greater than in the case of the first embodiment. This structure is advantageous in cases requiring greater hold for heavy display part 1, but there are some points to be taken into consideration. These points will be further described referring to FIG. 12 which is a top plan view of FIG. 11.

Figure 12:
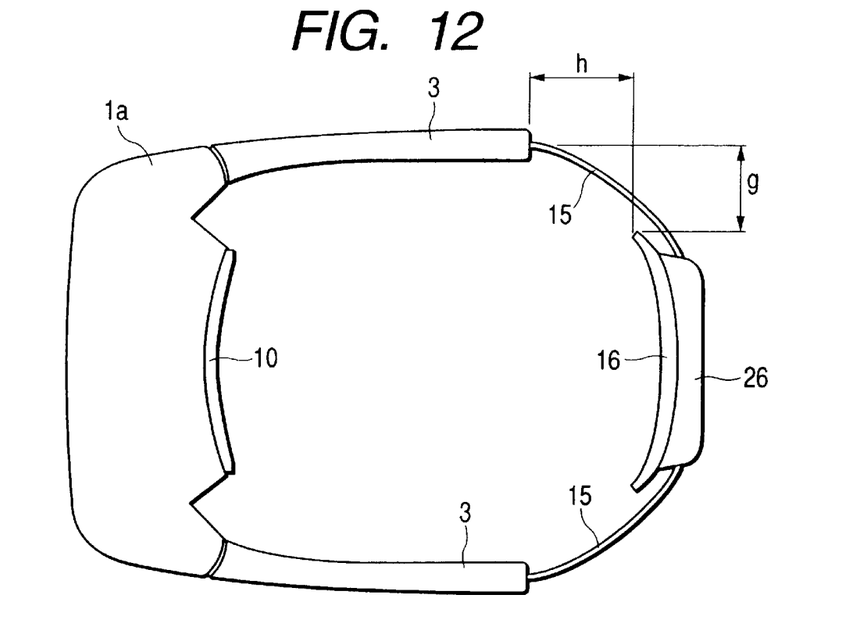
FIG. 12 is a diagram to explain points for which care should be taken in designing of the head mounting mechanism according to the second embodiment of the present invention.

In FIG. 12, let g be the spacing in the width direction between the frame 3 and the end of the occipital pressing pad 16 in the mounted state and h similarly be the spacing in the longitudinal direction between the frame 3 and the end of the occipital pressing pad 16. When the lengths g and h are too large, the bands 15 could press the temporal regions if the wearer has the large head. When the lengths g and h are small to the contrary, the occipital pressing pad 16 and frames 3 could interfere with the head so as to cause failure in mounting if the wearer has the small head. It is thus necessary to determine the size of the occipital pressing pad 16, the length of the frames 3, the hardness against bending of the bands 15, and so on so as to prevent the bands 15 from pressing the temporal regions and avoid the interference between the frames 3 and the pad 16 during mounting action within the range of the head size of objective people.

Modification of the Second Embodiment

The present embodiment employs the structure in which the frictions 4 are used in the hinge parts between the display part 1 and the frames 3 so as to permit the frames 3 to be fixed at any rotational position, as in the first embodiment. However, when the left and right frames are connected by the bands as in the present embodiment, the frames 3 may be arranged to be always energized outward (in the direction of an arrow G) by a torsion coil spring or the like, as illustrated in FIG. 13.

Figure 13:
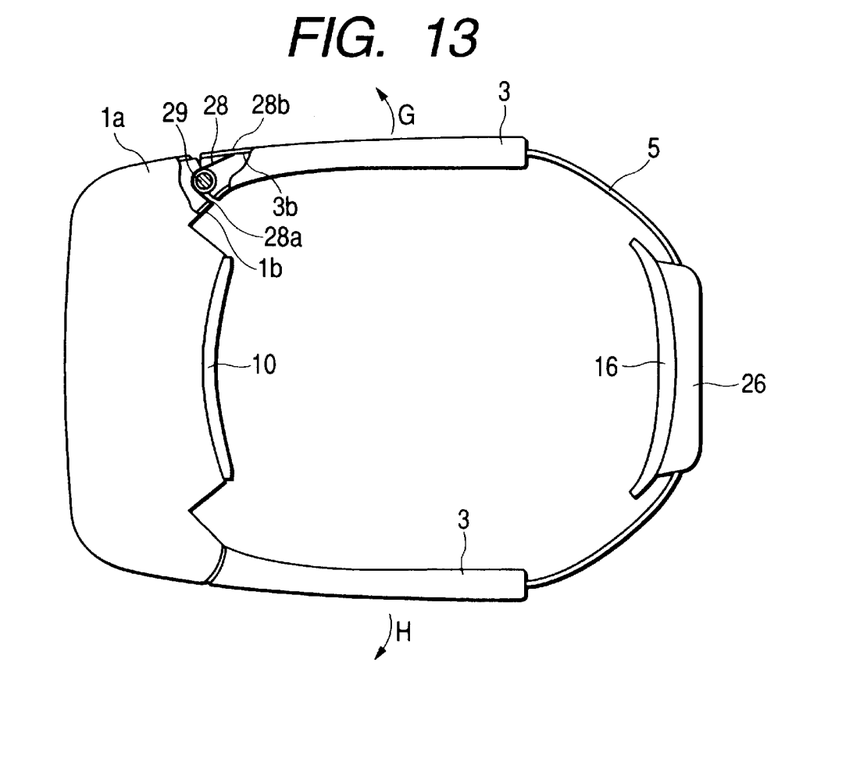
FIG. 13 is a diagram to explain a modification of the second embodiment.

In FIG. 13, numeral 29 designates a shaft integrally provided on the support 1a and the frame 3 is attached so as to be rotatable by a predetermined angle about the rotational axis of the shaft 29. A torsion coil spring 28 is fitted on the shaft 29 so that one end hits a wall 1b of the display part and the other end a wall 3b of the frame 3. Then the frame 3 is urged in the direction of the arrow G by the torsion coil spring 28. The description herein concerned only one side for convenience' sake of description, but the torsion coil spring is also provided similarly on the other frame 3 so as to energize the frame 3 in the direction of an arrow H.

When the display part 1 is fixed on the head by the pad 10 and the pad 16 with the frames 3 lightly touching the temporal regions, the frames 3 do not press the temporal regions, because they are urged outward by the torsion coil springs 28.

Third Embodiment

Figure 14:
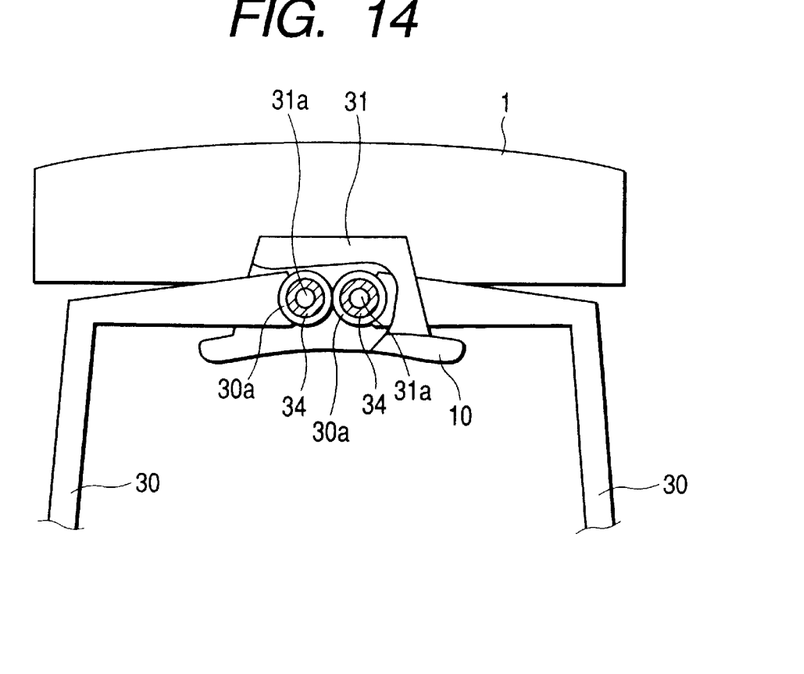
FIG. 14 is a diagram to show the structure of main part of a head-mounted display device to which the head mounting mechanism according to the third embodiment of the present invention is applied.

FIG. 14 is a diagram to show the structure of the head mounting mechanism according to the third embodiment of the present invention. In the first and second embodiments described above, when the frames 3 are turned on the fulcrums of the hinge parts up to the temporal regions, turn angles of the left and right frames can be different from each other relative to the display part. This situation tends to occur, particularly, in the case wherein there is a difference between the left and right frictional forces of the frictions 4. In this case, the observation distances of the left and right eyes to the display part 1 are different from each other in a state in which the left and right frames touch the temporal regions. For that reason, there occurs a need for a cumbersome work to correct the position before the display part 1 faces right front. The present embodiment is designed for the purpose of avoiding such a problem.

In the figure numeral 30 indicates a pair of frames connecting the frontal presser 31 with the pads etc. (not illustrated) which press the occipital region, and a pair of gears 30a having the same number of teeth are integrally formed at the ends of the frames 30 inside the frontal presser 31. Then the gears 30 are rotatably fitted on respective shafts 31a provided in the frontal presser 31 so as to gear with each other. A friction 34 is set between the rotary part of each frame 30 and the corresponding shaft 31a so that a constant frictional force acts against the rotation of the frame 30. The frictions 34 can be of the same structure as the frictions 4 described in the first embodiment.

When the left and right frames 30 are turned about the rotational axes of the shafts 31a, the left and right frames 30, 30 are always turned by an equal angle, because the gears 31a, 31a are in mesh with each other. Namely, the frames 30, 30 rotationally move in symmetry relative to the display part 1. When the frames 30 touch the temporal regions, the display part 1 always faces right front accordingly.

The mechanism of pressing the occipital region in the connected state to the frames 30 can be either one of the mechanisms described above in the first and second embodiments.

Fourth Embodiment

Figure 15:
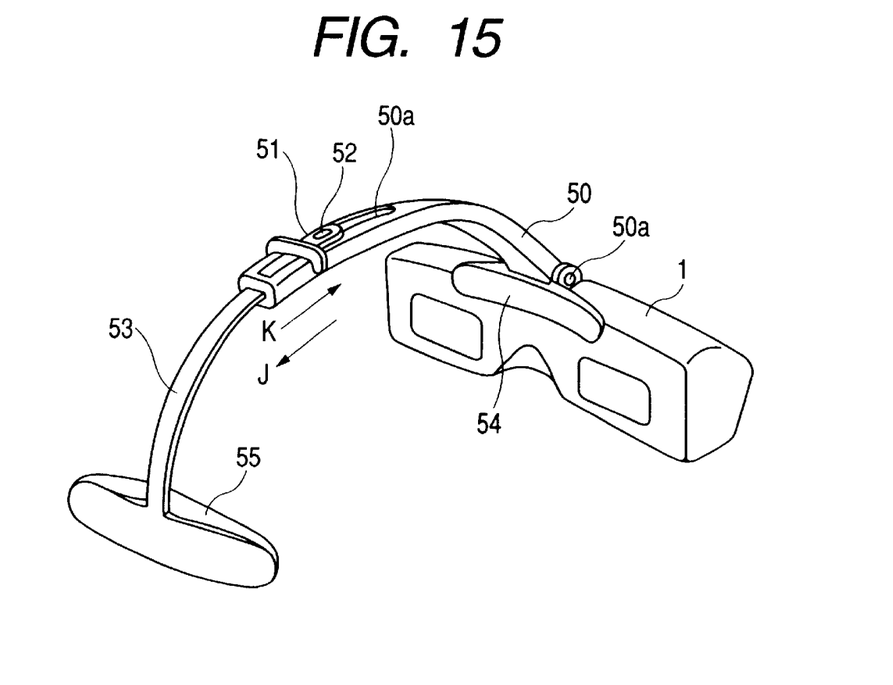
FIG. 15 is a perspective view to show the structure of a head-mounted display device to which the head mounting mechanism according to the fourth embodiment of the present invention is applied.
Figure 16:
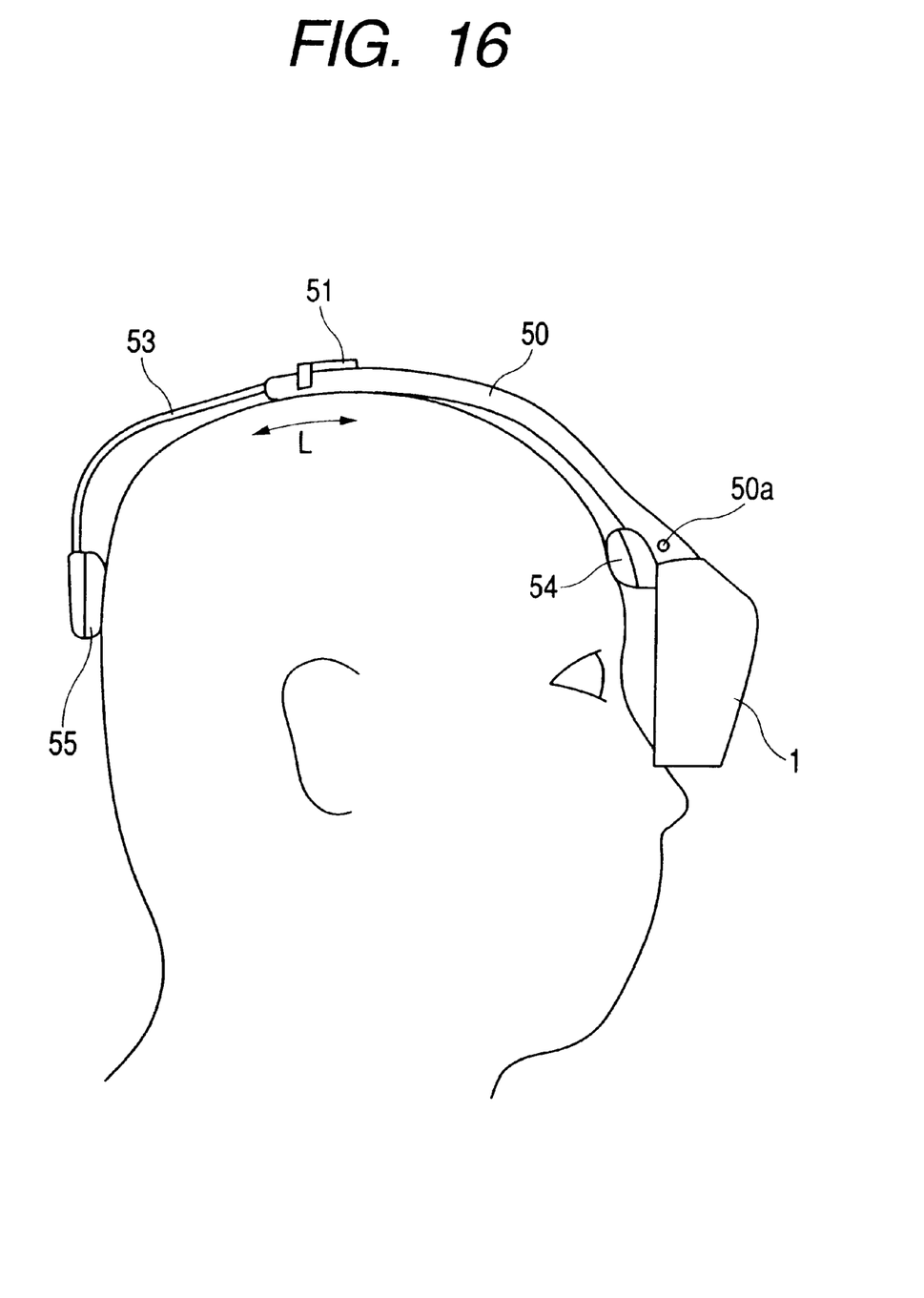
FIG. 16 is a diagram to show a state in which the head-mounted display device of FIG. 15 is mounted.

FIG. 15 and FIG. 16 are diagrams to show the structure of another head-mounted display device to which the head mounting mechanism according to the fourth embodiment of the present invention is applied; FIG. 15 is a perspective view of the device and FIG. 16 a diagram to show a mounted state of the device.

In the first to the third embodiments described above, the frames 3 and 30 were designed to extend along the temporal regions from the left and right of the support 1a, whereas the head mounting mechanism of the present embodiment is different therefrom in that a frame extends along the parietal region.

In FIG. 15, the display part 1 is attached to the frame 50 so as to be rotatable about a rotational axis 50a. A constant frictional force is given between the rotational axis 50a and the display part 1 so that the display part 1 can be fixed at any rotational position.

A spongelike pad 54 which presses the frontal region is integrally attached to the frame 50. A pressing spring 53 with the spring property is attached to the frame 50 so as to be slidable in the longitudinal direction thereof. The fitting part between the frame 50 and the pressing spring 53 is constructed so as to permit free motion in the direction of an arrow K but lock the spring in the direction of an arrow J by a ratchet mechanism, as described referring to FIG. 6 to FIG. 8 in the first embodiment. For moving the spring in the direction of the arrow J, while the ratchet mechanism is released by depressing a release button 52, which corresponds to the release button 6 in the first embodiment, the pressing spring 53 is slid backward.

Numeral 51 denotes a knob integrally constructed on the pressing spring 53, which corresponds to the knob 5 in the first embodiment. Namely, the knob 51 slides along a slot 50a provided in the frame 50. A spongelike pad 55 which presses the occipital region is integrally attached to the pressing spring 53.

For mounting the present device on the head, as illustrated in FIG. 16, while pushing the pad 54 against the frontal region and lightly urging the frame 50 against the parietal region at the same time, the entire device is moved in the directions of arrows L (in the antero-posterior directions) along the parietal region so that the display part 1 is located at the best observation position in the vertical direction. Then the knob 51 is moved in the antero-posterior directions, i.e., in the directions of the arrows J, K (FIG. 15) to fix the display part 1 to the head so that the frontal pressing pad 54 and the occipital pressing pad 55 press the frontal region and the occipital region. The display part 1 is rotated about the axis of the rotational shaft 50a to change the distance between the display part 1 and the pupils before the observation distance agrees with the proper position.

Since the frame 50 lightly touches the parietal region, the display part 1 can be prevented from rotating on the fulcrums of the pad 54 and pad 55, as described in the first embodiment.

In the present embodiment the constant hold can also be always attained without pressure on the temporal regions, against the dispersion of the head size due to the individual difference.

In the present embodiment it was described that the adjustment of the observation distance was implemented by rotating the display part 1 about the rotational axis of the shaft 50a, but it can also be contemplated that the frontal pressing pad 54 is arranged movable relative to the display part 1 and the observation distance is adjusted by changing the distance between the frontal pressing pad 54 and the display part, as described referring to FIG. 2 in the first embodiment.

Other Embodiments

In the first to third embodiments described above, it is needless to mention that the pressing force of the frames on the temporal regions of the wearer does not always have to be zero and that the temporal regions can be pressed to such an extent that the pressing force is smaller than those on the frontal region and on the occipital region and is too weak to cause stress.

The fourth embodiment was described as an example showing only the structure in which the frame was formed along the parietal region of the wearer, but the frame does not always have to be set along the parietal region if a gravitational component of the pressing force of the frame on the wearer is greater than the other components and if a good balance is made in the mounted state.

The fourth embodiment showed the example in which there was only one occipital pressing pad, but it can also be contemplated that at least two occipital pressing pads are provided so as to separately press the left and right occipital regions and these occipital pressing pads are connected to the frontal presser by one frame or by a plurality of frames.

Further, the device in either one of the first to the third embodiments may be provided with a frame extending along the vicinity of the parietal region like the frame in the fourth embodiment, so as to assist the support of weight of the head mounting mechanism and mounted device by the parietal region of the wearer.

The first to third embodiments illustrated only the structure in which the frontal presser 2 and the frames were connected through the support 1a, but the frames and the frontal presser 2 may also be constructed to be connected directly to each other, for example, in the case wherein the frontal presser 2 also serves as the support 1a.

In addition, it is needless to mention that the head mounting mechanisms according to the present invention can be applied to mounting of any equipment without having to be limited to the display devices.

As described above, according to the present invention, the head mounting mechanism for mounting a device on the head is constructed so that the securing force is provided mainly by the press on the frontal region and on the occipital region and the temporal regions more sensitive to stress than the frontal region and the occipital region are not pressed or are pressed by only the force enough to prevent the rotation of the head mounting mechanism, which can decrease the stress and improve a wearing feeling in the mounted state. Since the frontal region and the occipital region, which are less sensitive to the stress than the temporal regions, are mainly pressed, the pressing force necessary for holding the mount position can be set greater than in the case of the temporal regions being pressed, and the tolerance of weight is also greater for mounted equipment. Further, the constant hold is always assured, regardless of the individual difference of head size.

What is claimed is:

1. A head mount mechanism for mounting a predetermined device on a head of a wearer or in the vicinity of the head, comprising:

frontal pressing means which presses the frontal region of the wearer;

supporting means connected to the device and to said frontal pressing means;

occipital pressing means which presses an occipital region of the wearer; and a pair of connecting means which connects said frontal pressing means to said occipital pressing means directly or through said supporting means and which are respectively along left and right sides of temporal regions of the head, wherein a spacing of said pair of connecting means is variable and said pair of connecting means includes resistance generating means which generates a force in a direction to resist movement in a direction to decrease the spacing.

2. A mechanism according to claim 1, wherein said resistance generating means includes a rotatable hinge at a connecting part between said connecting means and said supporting means or said frontal pressing means, and a friction member which generates a frictional force for movement of said hinge.

3. A mechanism according to claim 2, wherein said pair of connecting means is capable of expanding and contracting and has means which restricts an expansion of said pair of connecting means.

4. A head mount apparatus using a head mount mechanism as claimed in claim 2.

5. A mechanism according to claim 1, wherein said pair of connecting means are connected in the vicinity of the occipital region, said resistance generating means includes a rotatable hinge at a connecting part between said connecting means and said supporting means or said frontal pressing means, and a spring which increases the spacing between said pair of connecting means and is provided with said hinge.

6. A mechanism according to claim 5, wherein said pair of connecting means is capable of expanding and contracting and has means which restricts an expansion of said pair of connecting means.

7. A head mount apparatus using a head mount mechanism as claimed in claim 5.

8. A head mounting mechanism according to claim 5, wherein said pair of connecting means comprises two connecting means, and said head mounting mechanism comprises resistance generating means which is provided in a connection between each of said connecting means and said supporting means or said frontal pressing means and which generates a force in a direction to resist movement in a direction to decrease a spacing between said connecting means.

9. A head mounting mechanism according to claim 5, wherein said pair of connecting means comprises two connecting means and each of said connecting means connects said common occipital pressing means to said common frontal pressing means along the temporal regions.

10. A head mounting mechanism according to claim 9, wherein said pair of connecting means comprises two connecting means and said connecting means are energized in a direction to increase a spacing between said connecting means.

11. A head mounting mechanism according to claim 5, wherein said pair of connecting means comprises two connecting means, each of said connecting means is connected to said supporting means or to said frontal pressing means with a spacing variable between said two means, and amounts of displacement of said respective connecting means in variation of the spacing between said two means are equal to each other.

12. A head mounting mechanism according to claim 5, wherein said pair of connecting means comprises two connecting means and said connecting means are energized in a direction to increase a spacing between said connecting means.

13. A head mounting mechanism according to claim 5, wherein said pair of connecting means is placed along a line connecting said frontal pressing means and said occipital pressing means along the head of the wearer and passing in the vicinity of a parietal region of the wearer.

14. A mechanism according to claim 1, wherein said pair of connecting means is capable of expanding and contracting and has means which restricts an expansion of said pair of connecting means.

15. A head mount apparatus using a head mount mechanism as claimed in claim 1.

16. A head mounting mechanism according to any one of claim 1 to claim 8, claim 9, claim 11, or claim 12 to claim 13, wherein said frontal pressing means and said supporting means are connected so as to be movable in a direction to change a distance between said device and the wearer.

17. A head mounting mechanism according to claim 16, wherein said connecting means comprises movement limiting means which limits movement in the direction to increase the spacing between said frontal pressing means and said occipital pressing means.

18. A head-mounted apparatus using the head mounting mechanism as claimed in claim 17.

19. A head-mounted apparatus using the head mounting mechanism as claimed in claim 16.

20. A head mounting mechanism according to any one of claim 1 to claim 8, claim 9, claim 11, or claim 12 to claim 13, wherein said connecting means comprises movement limiting means which limits movement in the direction to increase the spacing between said frontal pressing means and said occipital pressing means.

21. A head-mounted apparatus using the head mounting mechanism as claimed in claim 20.

22. A head-mounted apparatus using the head mounting mechanism as claimed in any one of claim 1 to claim 8, claim 9, claim 11, or claim 12 to claim 13.

23. A head mount mechanism for mounting a predetermined device on a head of a wearer or in the vicinity of the head, comprising:
   frontal pressing means which presses a frontal region of the wearer;
   supporting means connected to said device and to said frontal pressing means;
   occipital pressing means which presses an occipital region of the wearer; and
   connecting means which connects said supporting means to said occipital pressing means and extends in the vicinity of a parietal region of the wearer.

24. A mechanism according to claim 23, wherein said connecting means is capable of expanding and contracting and has means which restricts an expansion of said connecting means.

25. A head head mount apparatus using a head mount mechanism as claimed in claim 24.

26. A head head mount apparatus using a head mount mechanism as claimed in claim 23.

27. A head mount mechanism for mounting a predetermined device on a head of a wearer or in the vicinity of the head, comprising:
   frontal pressing means which presses the frontal region of the wearer;
   occipital pressing means which presses an occipital region of the wearer; and
   a pair of connecting means which connects said frontal pressing means to said occipital pressing means directly or through supporting means and which are respectively along with left and right sides of temporal regions of the head,
   wherein a spacing of said pair of connecting means is variable and said pair of connecting means includes resistance generating means which generates a force in a direction to resist movement in a direction to decrease the spacing.

* * * * *

UNITED STATES PATENT AND TRADEMARK OFFICE
CERTIFICATE OF CORRECTION

PATENT NO. : 6,677,919 B2
DATED : January 13, 2004
INVENTOR(S) : Saito

It is certified that error appears in the above-identified patent and that said Letters Patent is hereby corrected as shown below:

<u>Column 4,</u>
Line 19, "lid." should read -- 11d. --; and
Lines 30 and 33, "lid" should read -- 11d --.

<u>Column 8,</u>
Line 10, "in mesh" should read -- enmeshed --.

<u>Column 9,</u>
Line 60, "the press" should read -- pressing --.

<u>Column 12,</u>
Lines 24 and 26, "head" (second occurrence) should be deleted; and
Line 38, "along with" should read -- along --.

Signed and Sealed this

Seventh Day of December, 2004

JON W. DUDAS
*Director of the United States Patent and Trademark Office*